United States Patent
Mrozinski

(10) Patent No.: US 10,904,841 B2
(45) Date of Patent: *Jan. 26, 2021

(54) SON ACCOUNTING FOR MAX GEOGRAPHICAL DISTANCE

(71) Applicant: Parallel Wireless, Inc., Nashua, NH (US)

(72) Inventor: Eric Mrozinski, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/660,344

(22) Filed: Oct. 22, 2019

(65) Prior Publication Data

US 2020/0053663 A1 Feb. 13, 2020

Related U.S. Application Data

(63) Continuation of application No. 15/905,820, filed on Feb. 26, 2018, now Pat. No. 10,455,522.

(60) Provisional application No. 62/463,468, filed on Feb. 24, 2017.

(51) Int. Cl.
| | |
|---|---|
| *H04W 52/28* | (2009.01) |
| *H04W 52/32* | (2009.01) |
| *H04W 48/10* | (2009.01) |
| *H04W 64/00* | (2009.01) |
| *H04W 24/02* | (2009.01) |

(Continued)

(52) U.S. Cl.
CPC ......... *H04W 52/283* (2013.01); *H04W 24/02* (2013.01); *H04W 48/10* (2013.01); *H04W 52/322* (2013.01); *H04W 64/006* (2013.01); *H04W 60/04* (2013.01); *H04W 84/18* (2013.01)

(58) Field of Classification Search
CPC .......................... H04W 52/283; H04W 52/322
USPC ...... 455/522, 69, 456.1, 456.5, 452.1, 404.2
See application file for complete search history.

(56) References Cited

U.S. PATENT DOCUMENTS

| | | | |
|---|---|---|---|
| 2010/0210255 A1 | 8/2010 | Amirijoo et al. | |
| 2011/0194513 A1* | 8/2011 | Kim ................... | H04W 52/244 370/329 |

(Continued)

*Primary Examiner* — John J Lee
(74) *Attorney, Agent, or Firm* — Michael Y. Saji; David W. Rouille

(57) ABSTRACT

A method is disclosed for determining an appropriate transmit power of a cell based on a desired coverage distance, comprising: initializing, at a cell, a cell reference signal transmit power at a high power level; broadcasting a cell signal power measure to require a high signal power level for user devices attempting to connect to the cell; progressively lowering the cell signal power measure at the cell; broadcasting the lowered cell signal power measure; deriving a plurality of user equipment (UE) attach request distances based on a plurality of propagation delay statistics derived from UE attach requests received at the cell; comparing the plurality of UE attach request distances against a maximum distance to obtain a number of UE attach requests received from UEs physically located beyond the maximum distance; and setting the cell reference signal transmit power based on the number of UE attach requests received from beyond the maximum distance, thereby iteratively determining an appropriate cell reference signal transmit power based on the maximum distance and on UE attach requests received at the cell.

20 Claims, 7 Drawing Sheets

(51) Int. Cl.
*H04W 84/18* (2009.01)
*H04W 60/04* (2009.01)

(56) References Cited

U.S. PATENT DOCUMENTS

| | | | |
|---|---|---|---|
| 2012/0113837 A1* | 5/2012 | Siomina | H04W 24/10 370/252 |
| 2015/0195066 A1* | 7/2015 | Singh | H04L 5/0032 455/452.1 |
| 2015/0327183 A1* | 11/2015 | Park | H04W 52/243 370/311 |

* cited by examiner

SON ACCOUNTING FOR MAX GEOGRAPHICAL DISTANCE

CROSS-REFERENCE TO RELATED APPLICATIONS

This application is a continuation of, and claims the benefit under 35 U.S.C. § 120 of, U.S. patent application Ser. No. 15/905,820, titled "SON Accounting for Max Supported Geographical Distance," and filed Feb. 26, 2018, which itself claims the benefit under 35 U.S.C. § 119(e) to U.S. Provisional Patent Application No. 62/463,468, filed Feb. 24, 2017 and titled "SON Accounting for Max Supported Geographical Distance," which is also hereby incorporated by reference in its entirety for all purposes. Additionally, the following documents are hereby incorporated by reference in their entirety: U.S. Pat. App. Pub. Nos. US20140086120, US20140092765, US20140133456, US20150045063, US20150078167, US20150094114 A1, US20160277992 A1, US20170026845 A1, US20160135132 A1.

BACKGROUND

In the Universal Mobile Telecommunications System (UMTS), which is a third-generation (3G) mobile cellular system, CPICH stands for Common Pilot Channel, known and used in UMTS and some other CDMA communications systems. In WCDMA FDD cellular systems, CPICH is a downlink channel broadcast by Node Bs with constant power and of a known bit sequence. Its power is usually between 5% and 15% of the total Node B transmit power. Commonly, the CPICH power is 10% of the typical total transmit power of 43 dBm. Signal quality in 3G is often assessed using one of two signal to noise ratio measures, called received signal code power (RSCP) and EcNo. Given that there is no CPICH in LTE, the equivalent is Reference Signals (RS) that are spread in time and frequency. The measurement that are used are RSRP for the power of the RS and RSRQ for the quality of the RS. The technique described herein could be used with respect to RSRP and RSRQ instead of the CPICH.

Also, in UMTS, a random access channel (RACH) message used by a user equipment (UE) to request access to a cell. To request access, the UE sends a RACH message on the uplink channel to the base station. While the 3G term RACH is used herein, a RACH can be understood to mean any attempt to access a cell, including the equivalent message in LTE (also a RACH message) or 5G.

Various means are known for configuring a cellular base station. However, the majority of such means are not dynamic in nature and require manual and/or static configuration of the cell.

Two measures of UMTS cell quality, Qrxlevmin and Qqualmin, are broadcast by the cell. Since increasing these values can effectively shrink the cell, this can be used as a simple way to control the effective size of a cell. Q values can be adjusted without cell reboot. However, in some cases this is insufficient to adequately ensure cell suitability for users in range of the cell.

SUMMARY

In a first embodiment, a method is disclosed for determining an appropriate transmit power of a cell based on a desired coverage distance, comprising: initializing, at a cell, a cell reference signal transmit power at a high power level; broadcasting a cell signal power measure to require a high signal power level for user devices attempting to connect to the cell; progressively lowering the cell signal power measure at the cell; broadcasting the lowered cell signal power measure; deriving a plurality of user equipment (UE) attach request distances based on a plurality of propagation delay statistics derived from UE attach requests received at the cell; comparing the plurality of UE attach request distances against a maximum distance to obtain a number of UE attach requests received from UEs physically located beyond the maximum distance; and setting the cell reference signal transmit power based on the number of UE attach requests received from beyond the maximum distance, thereby iteratively determining an appropriate cell reference signal transmit power based on the maximum distance and on UE attach requests received at the cell.

The method may further comprise setting the cell reference signal transmit power when a statistically significant number of UE attach requests may be received from distances less than the maximum distance but not from distances greater than the maximum distance. The method may further comprise further lowering the cell signal power measure at the cell when a statistically significant number of UE attach requests may be received from distances equal to or greater than the maximum distance, and collecting a further plurality of UE attach request propagation delay statistics. The method may further comprise analyzing the plurality of propagation delay statistics to obtain a statistically significant number of propagation delay statistics. The method may further comprise deriving the maximum distance from a maximum propagation delay of a UE request message based on a known timing of the UE request message relative to a reference signal broadcast by the cell. The cell may be a Universal Mobile Telecommunications Service (UMTS) nodeB, the cell reference signal transmit power may be a Common Pilot Channel (CPICH) transmit power, and the cell signal power measure may be Qrxlevmin. The cell may be a Long Term Evolution eNodeB, the cell reference signal transmit power may be an LTE Reference Signal (RS), and the cell signal power measure may be received signal reference power (RSRP) or received signal reference quality (RSRQ). The method may further comprise performing fine adjustment by stepping the value of the cell reference signal transmit power through a range of values.

In a second embodiment, a non-transitory computer-readable medium is disclosed comprising instructions which, when executed on a self-organizing network coordinating gateway, cause the gateway to perform: send a configuration message to initialize, at a cell, a cell reference signal transmit power at a high power level; cause the cell to broadcast a cell signal power measure to require a high signal power level for user devices attempting to connect to the cell; deriving a plurality of UE attach request distances based on a plurality of propagation delay statistics derived from UE attach requests received at the cell; comparing the plurality of UE attach request distances against a maximum distance to obtain a number of UE attach requests received from UEs physically located beyond the maximum distance; and cause the cell to set the cell reference signal transmit power based on the number of UE attach requests received from beyond the maximum distance, thereby iteratively determining an appropriate cell reference signal transmit power based on the maximum distance and on UE attach requests received at the cell.

The instructions may further comprise causing the cell to set the cell reference signal transmit power when a statistically significant number of UE attach requests may be received from distances less than the maximum distance but not from distances greater than the maximum distance. The instructions may further comprise further lowering the cell signal power measure at the cell when a statistically significant number of UE attach requests may be received from distances equal to or greater than the maximum distance, and collecting a further plurality of UE attach request propagation delay statistics. The instructions may further comprise analyzing the plurality of propagation delay statistics to obtain a statistically significant number of propagation delay statistics. The instructions may further comprise deriving the maximum distance from a maximum propagation delay of a UE request message based on a known timing of the UE request message relative to a reference signal broadcast by the cell. The cell may be a Universal Mobile Telecommunications Service (UMTS) nodeB, the cell reference signal transmit power may be a Common Pilot Channel (CPICH) transmit power, the cell signal power measure may be Qrxlevmin, and the self-organizing network coordinating gateway may be located in a UMTS core network or between the UMTS core network and the cell. The cell may be a Long Term Evolution eNodeB, the cell reference signal transmit power may be an LTE Reference Signal (RS), the cell signal power measure may be received signal reference power (RSRP) or received signal reference quality (RSRQ), and the self-organizing network coordinating gateway may be located between an LTE core network and the cell. The instructions may further comprise performing fine adjustment by stepping the value of the cell reference signal transmit power through a range of values.

In a third embodiment, a non-transitory computer-readable medium is disclosed comprising instructions which, when executed on a processor in a cellular base station, cause the cellular base station to perform: initializing a cell reference signal transmit power at a high power level; broadcasting a cell signal power measure to require a high signal power level for user devices attempting to connect to the cellular base station; progressively lowering the cell signal power measure at the cellular base station; broadcasting the lowered cell signal power measure; deriving a plurality of user equipment (UE) attach request distances based on a plurality of propagation delay statistics derived from UE attach requests received at the cellular base station; comparing the plurality of UE attach request distances against a maximum distance to obtain a number of UE attach requests received from UEs physically located beyond the maximum distance; and setting the cell reference signal transmit power based on the number of UE attach requests received from beyond the maximum distance, thereby iteratively determining an appropriate cell reference signal transmit power based on the maximum distance and on UE attach requests received at the cellular base station.

DETAILED DESCRIPTION

Figure 1:
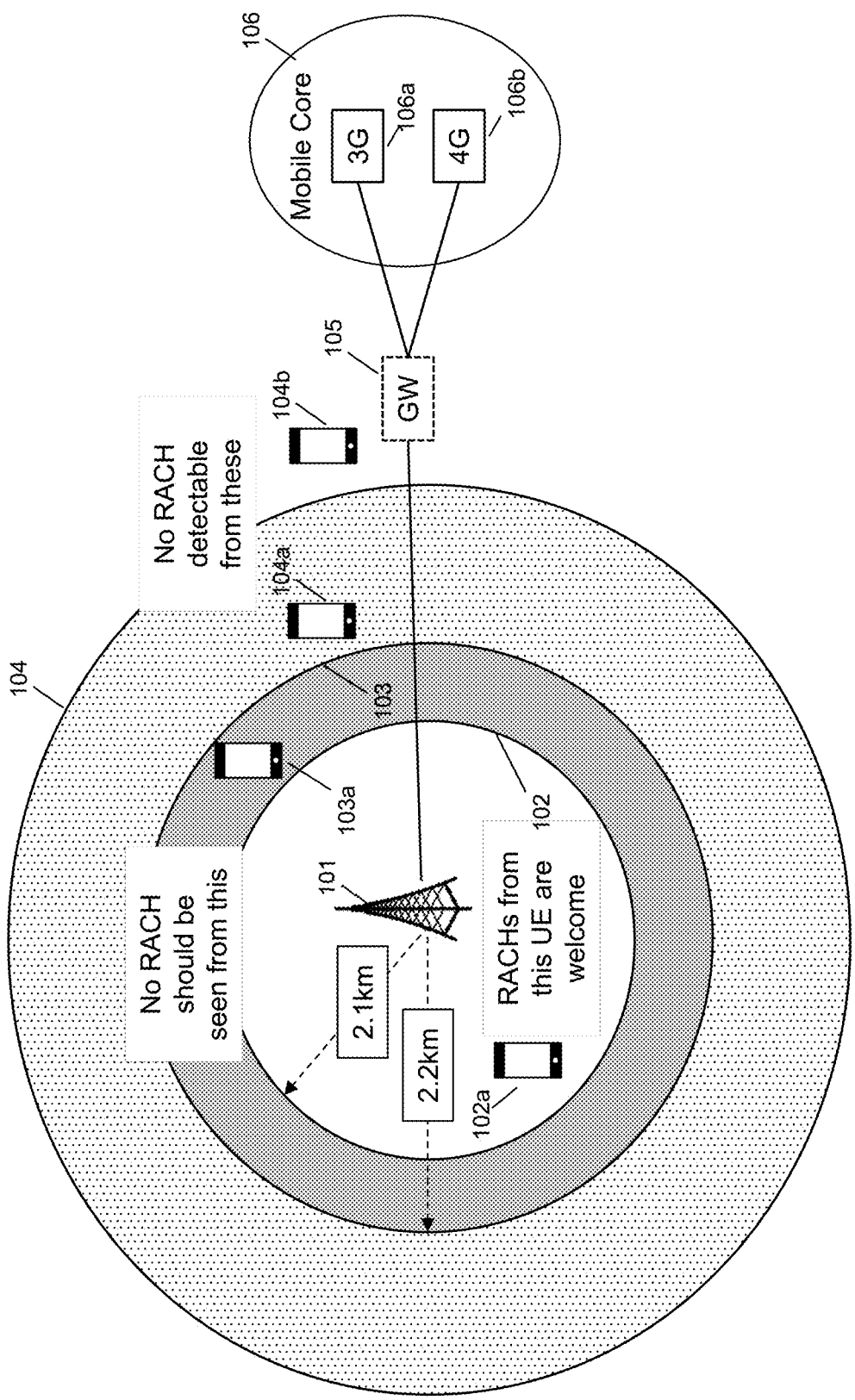
FIG. 1 is a schematic diagram of a wireless access network deployment, in accordance with some embodiments.

One problem is that even when a high transmit power is configured to provide a large coverage area, the CPICH signal is sometimes decodable at a geographic distance that is nevertheless too far away for the cell to pick up the transmissions of the UE. This results in the situation where if the UE is not attached to a cell with suitably high signal quality, the UE is attached but does not receive service.

One way to resolve this problem is to shrink the cell. Shrinkage of the cell can be done either by increasing the Q values (but requires you to also adjust CPICH power), or by directly reducing CPICH transmit power. Reduction of CPICH transmit power has the advantage of decreasing required power simply due to the decrease in power required to transmit the CPICH signal.

In order for the signal to be within the cell suitability range, for a given UE, both EcNo and RSCP must be above a threshold for the UE to select the cell. This ensures that the UE will be able to both attach to the cell and receive and transmit effectively with the cell; in this disclosure, this measure is called cell suitability. The present disclosure discloses a method to shrink the cell and configure CPICH power in such a way as to avoid decodability of the CPICH beyond the geographic area of desired coverage while providing high cell suitability for the UEs that can be reached by the CPICH signal.

Two formulations of coverage are contemplated by the present disclosure. In some embodiments, a mapping is created between a physical distance formulation (or geographic distance formulation) of the coverage area of a cell and a power level formulation of the coverage area of the cell. The distance formulation may be based on a distance in meters, kilometers, miles, or any other generally accepted measure of length; a round trip time or signal travel time based on the speed of signal propagation between a base station and a UE; latitude/longitude or GPS coordinates; or another measure that can be translated into a physical distance. The power level formulation may be based on values used for CPICH, Qrxlevmin, and Qqualmin, or some combination thereof. The mapping may take into account the statistical significance of the measurements used to generate the mapping.

In some embodiments, a cell suitability range (CSR) is contemplated, wherein the CSR is a range of configuration values for the cell that enable certain users to connect. Practically speaking, this CSR range is a range in which RSCP<Qrxlevmin and EcNo<Qqualmin, and wherein only a small number of users are able to receive the CPICH message but not able to connect to the cell (i.e., send a RACH request message that is received by the cell, or receive meaningful throughput on a downlink connection with the cell, or both).

If the cell is required to support a specific geographical distance (meters, not path loss), then the task is to determine the suitable maximum supported path loss and corresponding suitable values for: Maximum total DL TX power; RL-specific max DL TX power; and Maximum UE UL TX power. Determining these values is the task of a self-organizing network (SON) functionality. SON is described more generally in U.S. Pat. Pub. No. US20140092765, hereby incorporated by reference in its entirety, and may be coordinated at a central gateway, at a dedicated SON device, at the edge (e.g., at each cell), or in some combination thereof. All of these alternatives are considered by the inventors.

The maximum total DL power determines the cell's DL capacity (in conjunction with observed interference on the DL frequency band.) This is because DL power is interference to neighbor cells. DL power on own-cell effectively borrows ("steals") DL capacity from one or more neighbor cells, but with the goal of utilizing it effectively—that is, converting it into own-cell downlink capacity that is a multiple of the borrowed DL capacity. The challenge lies in finding the sweet spot. If the cell's DL power is chosen too high, the goal is not met: neighbors suffer, while the multiplication doesn't take place, or, the multiplication might happen, but it is not used (e.g. too few UEs to serve in the own-cell). The inventors have appreciated that it is beneficial to apply as little amount of power while fulfilling the operator's requirement for cell DL capacity (e.g. expressed as required aggregate DL data rate at cell edge) and desired maximum supported path loss (target coverage). The Maximum total DL power serves, among others, as a trigger for considering downgrade of RLs, or handing them out.

The RL-specific max DL power determines the maximum DL power that the cell spends on any single UE (user). It depends on the targeted cell range and the minimum QoS (essentially data rate) that the operator wants to guarantee to any UE (also that located at cell edge). It makes no sense to spend a high amount of DL power—meaning share of total available DL cell capacity—for one user, while other users suffer, or while less than desired number of users can be serviced, or while not making use of the fact that users close to the base station would benefit much more from DL power allocation than e.g. remote users.

Accordingly, it is desirable to determine a suitable minimum DL power for a RL, such that a minimum QoS can be met also at cell edge (e.g. that of speech+low-rate DL data). If the operator decides he also doesn't want to spend more than that power on a single UE, because that power allows him to give the UE at cell edge the targeted min QoS, that "cell-edge-minimum" become the is the maximum to spend on the UE in general (i.e. at any location within the cell). The natural conclusion is to make this maximum (RL-specific) DL power serve at least two purposes: 1. as threshold for downgrade of radio links (e.g. 384->128->64), when the UE moves away from the base station, towards cell edge (DL Power increasing); and 2. as trigger for handout, when the UE reaches cell edge (DL power increases), and further downgrade is not possible.

Notably, CpichPwr has a lower limit. This means when you have a lot of overlapping small cells, they all have to use the minimum CpichPwr but then additionally they need to set a high Qrxlevmin to artificially reduce the cell size. Therefore, when small cells are deployed, it is important to determine an appropriate value for Qrxlevmin.

The max UE UL power is the maximum UL power at which the UE is allowed to transmit, and hence it sets the maximum (UL) path loss that a UE can overcome (at a given UL rate, and with a given overall UL cell load). It is important that the own-cell UEs exert only a certain maximum/deterministic amount of interference on neighbor cells, individually and/or collectively. This is an objective of network planning and SON.

Accordingly, it is desirable to determine a suitable maximum UL TX power for a UE, such that a minimum QoS can be met (e.g. that of speech+low-rate UL data), when the UE is at cell edge. That UL power serves as threshold for downgrade of radio links (e.g. 384->128->64), or as a trigger-threshold for handout, as the UE approaches cell edge, and therefore the UL power increases.

The propagation delay may be determined as follows. The UE times its RACH with the CPICH frame boundary. Based on knowledge of the time that the CPICH is sent out, we can derive the round trip time (RTT), and the propagation delay is half of the RTT. The propagation delay may be reported by the L1 stack at the base station for every received RACH. This gives us the geographic distance. Propagation delay tells us how many km away. This is directly related to meters.

The rest of this disclosure will not cover how to determine RL-specific max DL power and Max UE UL Tx Power, and assumes that SON takes care of this. This disclosure also assumes that SON determines Max total DL TX power, possibly as a function of coverage-target and required DL capacity.

It is in fact irrelevant for the task of accounting for maximum supported geographical distance, how these values are determined. Instead, the process of assuring that the cell's power settings cover the desired geographical distance and not more, uses the initially determined power levels as starting point and works its way from there.

For simplicity, this disclosure describes the case where the power levels initially cover a larger cell geographical range (radius) than what is desired, and therefore need to be reduced. The way from too small to larger is analogous.

When DL power settings are such that the cell has a larger than the desired (or supported) radius, the consequences are: 1) waste of electrical power; 2) need to dissipate the excess power; 3) excess/avoidable interference caused to neighbor cells' UEs (on DL); and 4) more UEs camping on the cell than what the cell is capable of handling. After all, the desired radius might have been the result of considerations on how many UEs to service. Also, when coverage diverges from a desired geographic radius, maps and geographic information system (GIS) technology cannot be used as a tool by the network operator to predict coverage/interference.

Cell suitability criteria. Qrxlevmin allows to logically define a radius that is lower than what the cell can power-wise achieve. This avoids consequence 4.). But it requires to set Qrxlevmin to an unnaturally high level, such as −85 dBm, or −95 dBm, where the usual value is rather in the range of −110 to −115 dBm. This has other implications, such as requiring cell-by-cell tuning of handout-triggering EcNo or RSCP-based thresholds (task of SON).

Two further problems arise in the case where the cell is not able to support a cell radius larger than e.g. 2.2 km, due to limitations in L1 (preamble search window), but the DL power settings allow to reach much farther, particularly in line of sight conditions: 5) excessive loading of the own cell's receiver due to unanswered/useless RACHs; and 6) excessive interference caused to neighbor cells' receiver, hence reducing their available UL capacity.

The problem is illustrated with following example. A UE located farther than the 2.2 km will still find the cell suitable, unless Qrxlevmin is chosen so high that the cell is logically limited to 2.2 km or less. If the parameter is at the usual −110 to −115 dBm, a UE in much bigger distance considers the cell suitable as well. The UE then tries to camp on that cell and can either send a RACH to register, or it camps on that cell without explicit registration, and waits for the next speech or data call, involving a RACH.

Due to the L1's inability of detecting a RACH that is sent from a distance larger than the 2.2 km, the RACH remains unanswered and is hence repeated with higher power than the last. The RACH is repeated a number of times, at ever-increasing UE TX power, which creates interference at the own-cell's as well as on other-cells' receiver, and can disrupt services in the neighborhood. Worst case: it can kick off a chain reaction of UL party effect which propagates through the network.

All below presented solutions consist in adjusting the cell range, and collecting statistical data with regards to UE registration requests and geographical distance (propagation delay, measured during UEs RACH attempts), and re-adjusting and re-collecting, and so on.

Solution 1

One solution to the problems 4 and 5 is to reduce the cell range by logical means—by increasing the cell suitability threshold Qrxlevmin, to a level where all UEs located farther than the 2.2 km no longer find the cell suitable. But problems 1 thru 3 are not addressed.

Solution 2

The better solution is to adjust the cell's power level (Maximum total DL TX power) while keeping Qrxlevmin at a constant usual level (e.g. −115 dBm). This addresses 1 thru 3 as well.

Although that solution is what should be aimed at, the process is slow, and it requires a number of adjustments, each involving a shutdown and restart of the cell. Note that the modification of Maximum total DL TX power requires the restart of the cell (via L1 control message CELL_SETUP_REQ). This could only be done on rare occasions (e.g. every 24 hours).

Solution 3 (Hybrid)

This solution combines solutions 1 and 2, and consists in adjusting over a period of time (e.g. 24 h) the size of the cell through logical means (solution 1), until there is statistical evidence that all UEs located farther than X km don't find the cell suitable. After that period, the modified value of Qrxlevmin is used as base to determine the amount by which the cell range (max path loss) shall be reduced, which implies also the reduction of Maximum total DL TX power and Max UE UL power. When the new power value is set, the original value of Qrxlevmin is re-installed. The advantage of this solution, compared to solution 2, is that it requires few iterations, or ideally only one, to set the cell's power adequately—aligning it with the max targeted geographical range (max prop delay).

Solution 4

The solution is best based on solution 3 (hybrid), but needs a special way in collecting and interpreting the statistics and accommodates for lack of support for more than 2.2 km corresponding propagation delay. If L1 is not able to detect RACH preambles sent by UEs at more than 2.2 km distance, statistics cannot be generated based on those. This requires another way to conclude whether all UEs at larger than 2.2 km distance are prevented from finding the cell suitable. Only UEs at a maximum 2.2 km distance can supply statistics.

If a range between e.g. 2.1 km and 2.2 km is used as guard-range—provided it allows to gather sufficient number of statistical samples—the valid assumption is that no UE at larger than 2.2 km distance finds the cell suitable, if the cell no longer receives RACHs from UEs at 2.1 km to 2.2 km distance either.

The task is to adjust/reduce the cell size as in solution 3, while assuring that RACHs still arrive from UEs that are located at up to 2.1 km distance, while no more RACH from more distant UEs are seen (qualified based on the corresponding propagation delays reported during the RACH attempts).

FIG. 1 is a schematic diagram of a wireless access network deployment, in accordance with some embodiments. FIG. 1 illustrates the principle. Base station 101 creates cell coverage areas 102, 103, 104. Coverage area 102 is an area where UE 102a is able to enjoy effective signal coverage, i.e., a pilot signal such as a CPICH can be received and decoded, and signals from the UE can also be received by base station 101. The geographic area of coverage area 102 has a radius of 2.1 km. Coverage area 103 is an area where UE 103a is able to receive and decode a pilot signal, but where signal quality is poor, such that UE 103a experiences poor, interrupted, or intermittent service when it attaches to base station 101; it follows that UE 103a should not be permitted to attach to base station 101. The geographic area of coverage area 103 has a radius of 2.2 km. Coverage area 104 is a coverage area where UE 104a is able to receive a pilot signal, but where the pilot signal cannot be decoded, or where the UE's transmissions cannot be received by base station 101; it follows that UE 104a should not be permitted to attach to base station 101. Outside of coverage area 104, UE 104b is unable to receive the pilot signal or any other signal from base station 101. A gateway 105, which corresponds to a 3G RNC, SON server, or 4G virtualization server, is also shown, and a communications path exists for base station 101 via gateway 105 to mobile core network 106 (further including 3G core 106a and 4G core 106b, in some embodiments).

All solutions have in common that the cell size is adjusted to a maximum desired geographical size (e.g. 2.1 km radius), but based on DL transmission power, UE measurements (RSCP) and cell suitability criterium (Qrslevmin). The cell size therefore corresponds to an achievable maximum path loss. But because the cell path-loss distribution is not concentric from geographical perspective, the path loss that reaches in one direction from cell center all the way to the 2.1 km distance, due to line of sight, may not make it all the way in another direction, where there is no line of sight. In the extreme case, the cell may reach 2.2 km only in a small sector within a omnidirectionally transmitting cell. This is inherent to 3G (and any other wireless system), where the UE has no knowledge of its distance to the base station—at least until after it has sent a RACH.

The benefit of this solution is that the total DL power adjusts to the path loss conditions that are specific for the cell. If, due to many obstacles, the cell requires more power to reach the 2.2 km (at least in one sector), the result of the solution is to determine a higher total DL power than if the base station was located in flat land with line of sight in all directions.

Seen from another perspective, the solution may achieve the desired 2.2 km . . . well, 2.1 k, at least in one direction. That is, obviously, as long as the cell does not reach its physical/RF power limits.

The problem to solve is to account for the limit of L1 with respect to propagation delay: the inability of detecting RACH bursts that are sent from a location of, let's say, 2.2 km onwards. The solution is to determine the right settings for Max Total Downlink Power and CPICH Tx Power.

The best way to approach the optimal cell range in terms of max supported path loss and hence Maximum Total DL Power, is to start from a sensible level and work the way up, towards the maximum level that the RF supports—not the other way around as was sketched out above, to describe the principles.

The reason for starting low and increasing the supported max path loss, is that the whole optimization (rather calibration) process takes time and requires to have serviced a statistically significant number of UEs, to collect statistics before drawing conclusions and adjusting. During that time, undetectable RACHs from >=2.2 should be avoided, as they cause high interference on own- and other-cell, and are likely to negatively affect this optimization process itself.

The level at which to start off is based on line-of-sight path loss corresponds to the 2.1 km distance. Actually best is to initially aim for even less, such as 1.5 km, and work the way up.

Path Loss Over Distance can be computed using the formulas can be found e.g. at https://en.wikipedia.org/wiki/Free-space_path_loss, which is hereby incorporated by reference.

Below figure illustrates the path loss, assuming spherical radiation (no TX or RX antenna gain). It is probably better to take antenna gains into account, so that the initial setting is not too high and shoots beyond 2.1 km. This exercise is left to the actual implementation. All further presentation assumes spherical radiation.

Figure 2:
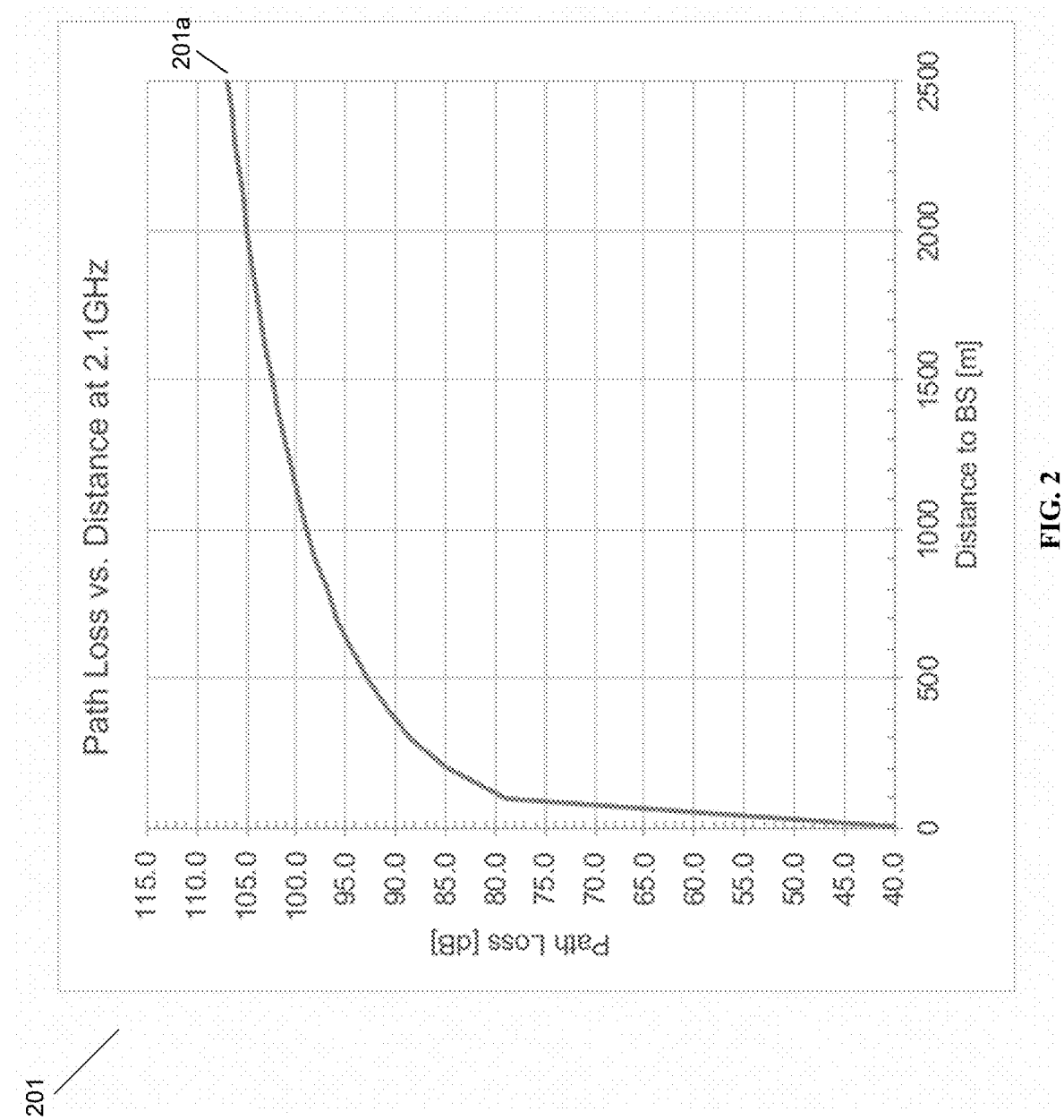
FIG. 2 is an exemplary plot of path loss versus distance.

FIG. 2 is an exemplary plot, 201, of path loss versus distance. The assumptions here are: line of sight, at 2.5 GHz, isotropic antennas. At curve 201a, FIG. 2 shows that the increase of path loss is very slow when going past 500 m. This requires precise determination of the start-values, and small steps when moving "up" from there. The path loss over 1.5 km distance is 102.4 dB. When considering TX and RX antenna gain, the path loss is actually lower with non-spherical radiation, which means that less power can be applied to reach the 1.5 km, compared to spherical.

Algorithm

This section presents the key elements and presents the algorithm sufficiently for implementation.

2.2 Initial CPICH Tx Power and Maximum Total DL Power

Assume that the "normal" Qrxlevmin is set to −110 dBm. With 102.4 dB path loss for 1.5 km, and cell to be suitable only up to that distance.

CpichTxPwr would have to be set as follows, for a UE only to camp on the cell, if located within 1.5 km of range: CpichTxPwr=PL+Qrxlevmin(normal)=102.4−110 dBm=−7.6 dBm. Max total DL power would be set 10 dB higher if CpichTxPwr is configured to be 10% of total: MaxDlTxPwr=CpichTxPwr+10 dB=2.4 dBm.

This start value looks small, and for most cell locations it is, as perfect line-of-sight is rare. It makes some sense to start with such low value, as the subsequent upwards adjustment process ("calibration") towards 2.5 km geographical range can be made efficient anyway (i.e. rapidly converging). But, in practice, above approach is not the right one, because each increment of power would require a cell shutdown and restart.

The pragmatic solution is to start with some high level of CPICH TX power level (e.g. 40 dBm), as e.g. initially set by the HNG. We can then vary Qrxlevmin on the fly and use the eventually-determined optimal value as input for one single adjustment of CpichTxPwr.

For example:
Start with a high level of initial power:
MaxTotalDlPwr (initial)=40 dBm (10 W)
CpichTxPwr (initial)=30 dBm (10%->1 W)

With the 30 dBm of CPICH power, this channel will usually reach much farther than the initially intended 1.5 km. The cell suitability criteria Qrxlevmin allows to limit the cell range by logical means. What value should it get?

With the given path loss of 102.4 dB, the UE at 1.5 km distance measures the CPICH-RSCP at:

CPICH-RSCP=CpichTxPwr (initial)−PL=30 dBm−102.4 dB=−72 dBm

So, if Qrxlevmin is set to this CPICH-RSCP (PL=1.5 km)=72 dBm, the logical cell range is at 1.5 km line-of-sight distance. Beyond that point, the UE no longer considers the cell suitable.

Qrxlevmin (initial)=CpichTxPwr (initial)−PL=72 dBm 2.3 Increasing the Cell and Qualifying Optimal Settings Now starts the upward adjustment process, which consists in bringing the cell into operation and serving UEs. With each UE served, the CWS collects information on the UEs' distance (L1 reported prop dly->meters).

As a practical example—no real line of sight anywhere in the cell—let's say the many UEs served for the first 30 minutes show distances no more than 1 km. Note: the calculated value of Qrxlevmin (72 dBm) would serve up to 1.5 km if at least one small section of the cell was offering line of sight.

Given that the DL power is high already, there is no need to increase that during the adjustment ("try and see") process. All that needs to be done, for increasing the range towards the 2.1 km, is to reduce Qrxlevmin.

The iteration is as follows:

1.) Decrease Qrxlevmin. Use above figure "path loss vs. distance for line of sight" as reference for how much the change should be. E.g. the path loss difference between 1 km and 2.1 km is 105−99=6 dB, so increase Qrxlevmin by 4 dB (security margin to not hit too high), to 76 dBm.

2.) Re-collect cell range statistics (i.e. propagation delay information) from RACH acquisition. When receiving a RACH, the base station's L1 determines reports propagation delay of the RACH (e.g., based on the known CPICH transmission timing, RACH transmission delay, RACH receipt timing, and the round trip time derived therefrom), which can be passed to the algorithm. Qualify their statistical significance (see below).

3.) Decision:
a. Does the CWS receive RACHs from UEs up to <MaxDistance−GuardDistance>=2.2−0.1 km=2.1, but not any RACH from UEs between 2.1 and 2.2? If yes, Qrxlevmin is optimal. Proceed to step 4.
b. Does the CWS see only RACHs from UEs that are well below 2.1 km? If yes, Proceed to step 1.
c. Does the CWS see RACHs from UEs that are also above <MaxDistance−GuardDistance>? If yes, increase Qrxlevmin and Proceed to step 2.

4.) The currently applied Qrxlevmin can be considered "optimal", for this given (initial) Cpich Tx Pwr (of 30 dBm). In our example, let's say:
Qrxlevmin (2.1 km, CpichTxPwr=30 dBm)=−95 dBm 5.) Determine CPICH Tx Pwr and Max Total DL Pwr, as follows:

$$PL(2.1 \text{ km}) = $$
$$CpichTxPwr \text{ (initial)} - Qrxlevmin(2.1 \text{ km}, CpichTxPwr = 30 \text{ dBm}) = $$
$$30 \text{ dBm} - (-95 \text{ dBm}) = 125 \text{ dB}$$

$$CpichTxPwr(\text{"final"}) = Qrxlevmin(\text{normal}) + PL(\text{MaxDistance})$$

Example:
CpichTxPwr(2.1 km,Qrxlevmin=−110 dBm)=−110 dBm+125 dB=15 dBm
==>MaxTotDlPwr ("final")=CpichTxPwr ("final")+10 dB (10%)=25 dBm

2.4 Re-Qualifying Optimal Settings

It is certainly useful to periodically verify that the power is still appropriate, to ensure two things: the power level is not detrimental because undetected RACHs are not transmitted; and to ensure the cell range does not fall significantly below what is aimed at: 2.1 km geographical range. This is especially true since the radio propagation conditions may have changed significantly since the initial "calibration"/adjustment. For this reason, a control loop is periodically executed in the background, to re-tune Qrxlevmin and/or the power values.

To be able to run such loop, it is necessary to set CpichTxPwr(final) and MaxTotDlPwr(final) slightly higher than what was determined in above step 5 (say 2 dB higher), so that variations of Qxrlevmin in this closed-loop in both directions can take effect. But this requires to increase Qrxlevmin by the same amount, to Qrxlevmin=−Qrxlevmin (normal)+2 dB=−108 dBm. Else, the cell range would end up higher than the targeted 2.1 km.

Granularity in Reported Propagation Delay

The propagation delay values reported by L1 (RACH-IND) are a multiple of 3 chips, if implemented in L1 per 3GPP specification. 3 chips correspond to 234 m distance, and 1 chip to 78 m. With a granularity as low as 234 m, the "GuardDistance" is at least 234 m, which means that the concept for "calibration" of DL power would allow for only 2.2 km−0.234 km=1.966 km geographical coverage. The granularity affects the margin of error caused by the "event horizon" (because the width is determined by the granularity of Qrxlevmin).

This can be avoided by a simple change in L1, to obtain 1 chip (78 m) granularity in the L1 reported prop delays. It shall be noted, though, that even small changes in power (dB), or in Qrxlevmin, have high impact on the range in meters, at distances around 2 km (see figure above: path loss vs. distance). This requires the granularity in Qrxlevmin and DL power levels to be high (ideally 0.1 dB).

Granularity in Setting Qrxlevmin and DL Power

The granularity of Qrxlevmin is defined by 3GPP (25.331, hereby incorporated by reference): 2 dB. This is quite low and not suitable for a straightforward implementation of above algorithm. However, as the granularity of CpichTxPwr and TotDlTxPwr is 0.1 dB(m), there are means to get close to the optimal settings, to serve the desired max 2.1 km range.

Collecting Statistically Significant Data

A first simple implementation could collect propagation delay statistics and look for absolute numbers of RACHs with the various propagation delays of interest. This has two disadvantages: it may take longer than required, to conclude on adjusting Qrxlevmin or the power levels; and wrong decisions could be taken, in adjusting those values. The solution is to consider statistical significance of gathered propagation delay values, and use of normalization, to account for the density of UEs (busyness of the cell), which can vary between cells, and which can also vary over time. The inventors have appreciated that these measurements are able to be collected at the cell itself, and therefore do not require additional functionality at the UE.

Figure 3:
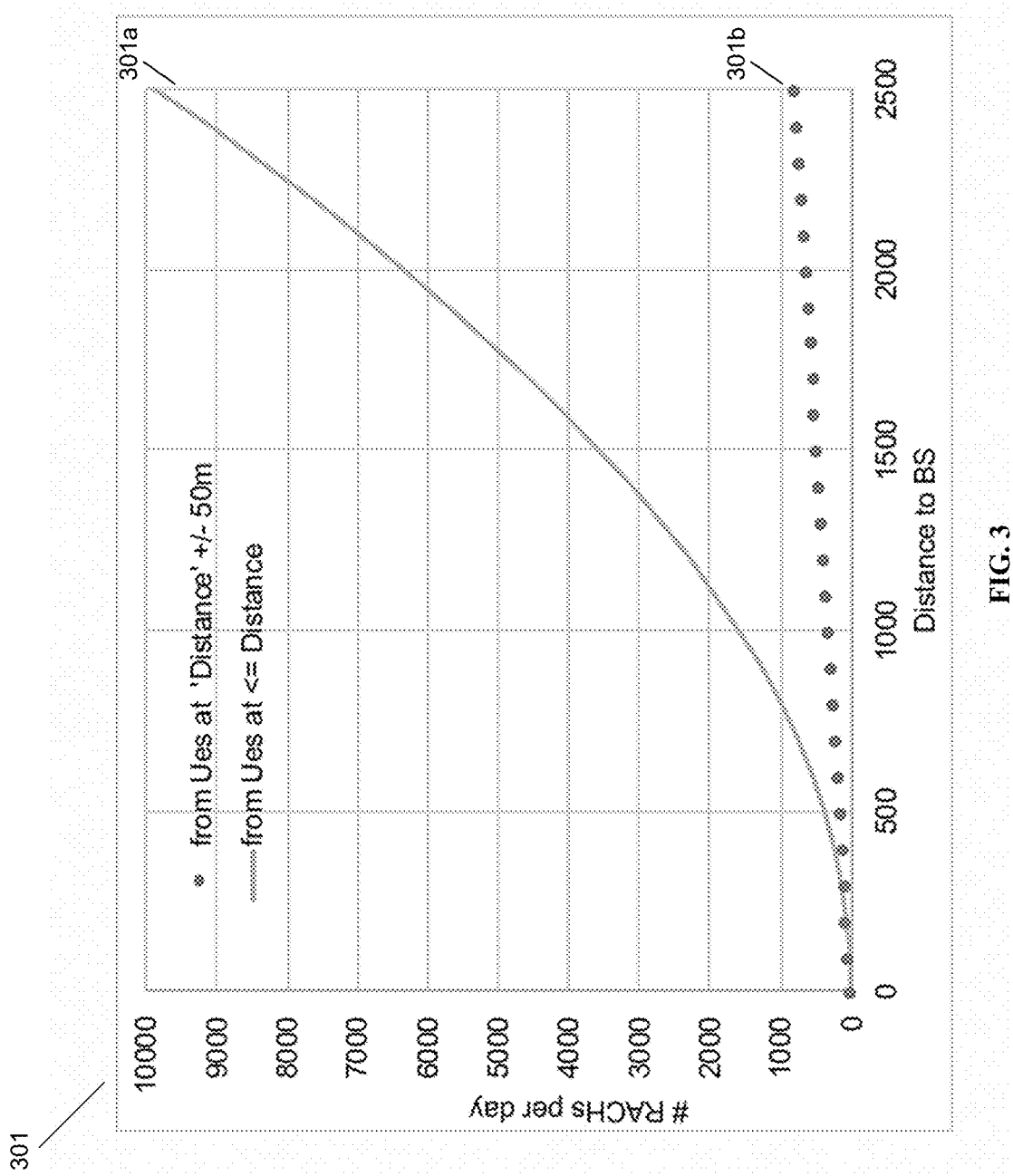
FIG. 3 is an exemplary plot of a number of RACHs received versus distance.

FIG. 3 shows how the RACH rate looks like, in the case of even distribution of UEs in the cell and no distance limitation. FIG. 3 is an exemplary plot of a number of RACHs received versus distance. Plot 301 includes curve 301a, a number of RACHs received from UEs at a distance from the base station of less than a maximum distance. Plot 301 also includes curve 301b, a number of RACHs received from UEs at a distance from the base station of the maximum distance plus or minus 50 meters, which corresponds to a cell edge area. As shown in curve 301b, the number of users connecting within the cell edge area rises monotonically without any particular cutoff.

Figure 4:
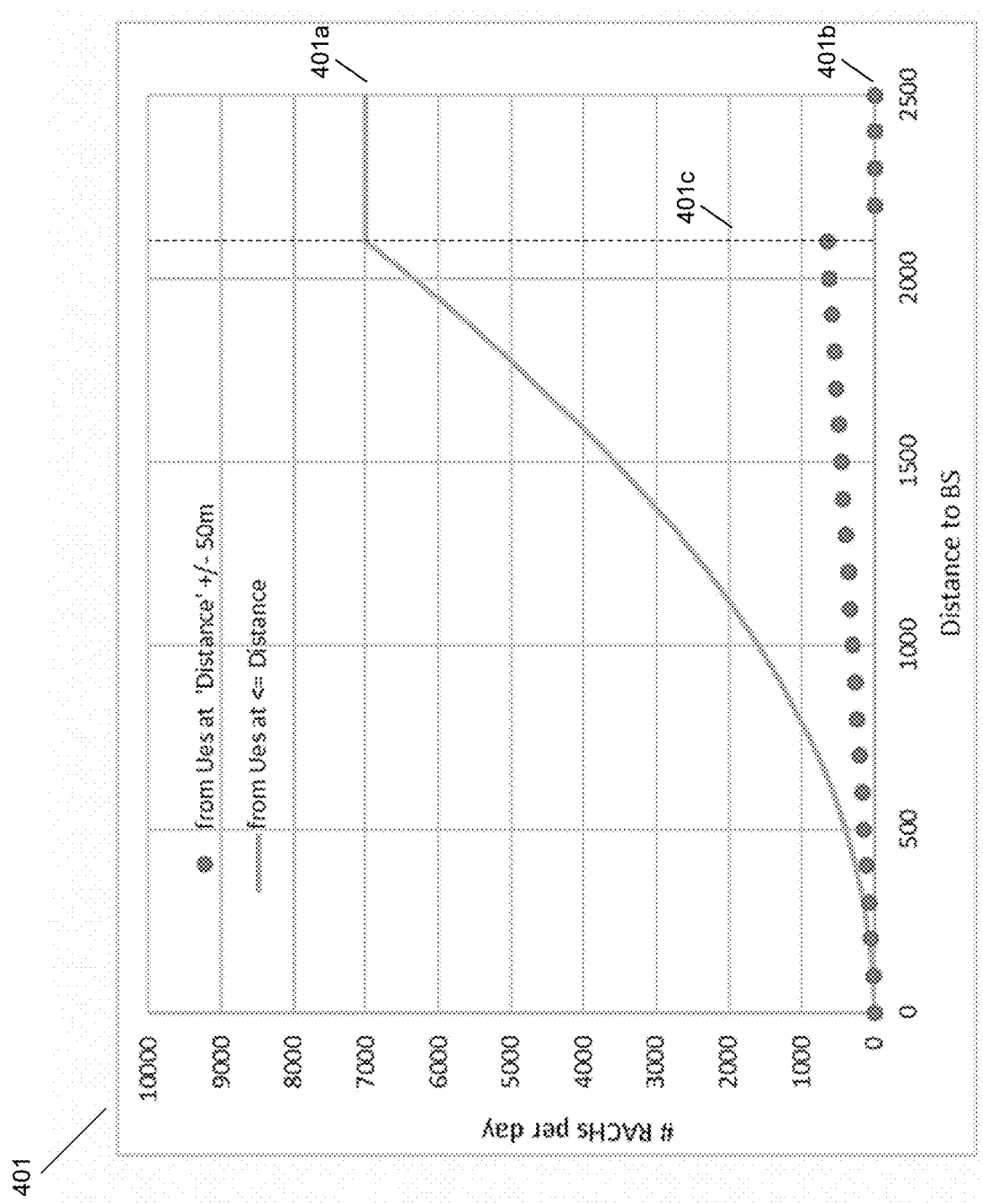
FIG. 4 is a plot of a number of RACHs received versus distance, in accordance with some embodiments.

FIG. 4 shows the result of optimal adjustment of MaxTotDlPwr, CpichTxPwr and Qrxlevmin: no RACH is detected from UEs located within the "guard range", while a plausible amount of RACHs from closer UEs are found. FIG. 4 is a plot of a number of RACHs received versus distance, in accordance with some embodiments. As with FIG. 4, plot 401 includes curve 401a, a number of RACHs received from UEs at a distance from the base station of less than a maximum distance. Plot 401 also includes curve 401b, a number of RACHs received from UEs at a distance from the base station of the maximum distance plus or minus 50 meters, which corresponds to a cell edge area. To stay with our example, qualifying a statistically significant cutoff 401c in activity, at 2.1 km distance, is the goal, and is shown in FIG. 4. Both curve 401a and curve 402b show that no additional UEs are attempting to connect to the cell past a UE distance of 2100 meters from the base station.

To establish a basis for statistical significance, is to go through a phase of collecting the RACH statistics, until the curves (# RACHs per sub-period) stabilize over time. This represents some sort of characterization of the cell with respect to average UE distribution. To save time, this phase could be done while Qrxlevmin adjustments are already taking place, if the initially obtained range is far smaller than e.g. 1.5 km. This characterization provides the basis for normalization, which in turn allows to use a generic value to qualify the cutoff. The location of the cutoff moves to the right as Qrxlevmin is (downward) adjusted).

Figure 5:
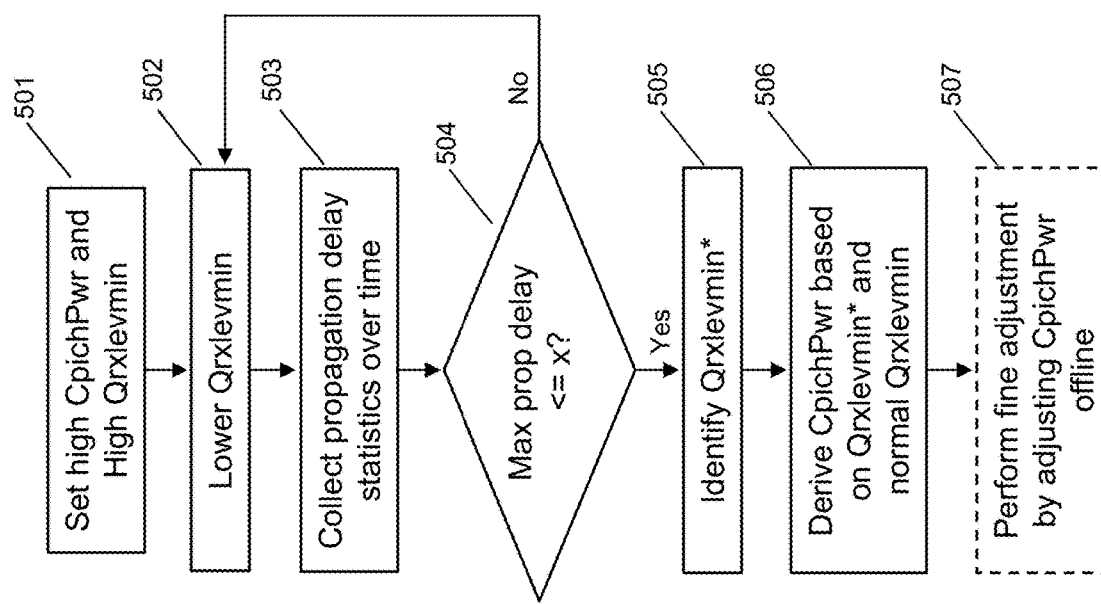
FIG. 5 is an exemplary flowchart of a method, in accordance with some embodiments.

FIG. 5 is an exemplary flowchart of a method, in accordance with some embodiments. At step 501, an initial value of CpichPwr and Qrxlevmin are set at the cell. This may be based on computation by the cell, or by a SON server, in some embodiments. The initial values of CpichPwr and Qrxlevmin are initially set at a high level to enable them to be lowered. At step 502, Qrxlevmin is lowered, and at step 503, propagation delay statistics, for example, based on RACHs, are collected over time. This may be over a period of hours or days, as needed, to obtain a statistically significant number of measurements. At step 504, the propagation delays may be examined to determine how far away the UEs are that are sending the attach requests to the cell. If the maximum propagation delay (the highest value received) is not less than or equal to a maximum delay parameter (or distance parameter), processing may continue at step 502, e.g., the currently configured value of Qrxlevmin at the cell may be lowered, to further reduce UE RACH attempts. Processing continues when RACH attempts with propagation delays greater than the max delay parameter (e.g., RACHs from distances greater than the max distance) are no longer received.

At step 505, the current value of Qrxlevmin is designated Qrxlevmin*. This may be lower than the initial value of Qrxlevmin. At step 506, this value is then used to derive an effective value for CpichPwr. This derivation is based on a "normal" value of Qrxlevmin, for example, −108−−115 dBm, as explained elsewhere herein. (The UE is specified by the standard to be sensitive down to −115 dBm Qrxlevmin.) At this point, an appropriate value for CpichPwr has been determined based on the maximum distance parameter. Further adjustment is possible, for example, at step 507, based on adjustment of CpichPwr directly; this is desirable as CpichPwr can be adjusted with a granularity of 0.1 dB, but is made difficult by the fact that often adjustment of CpichPwr requires the cell to be rebooted. To mitigate this in such cases, the adjustment may be performed gradually over a period of days, wherein cell reboot occurs at times when no users are connected, or during the middle of the night or at other times when the cell is not under load and in use. As CPICH power is 20× more granular than Qrxlevmin, repeatedly doing coarse adjustment no good. It is preferable to wait until the middle of the night to perform the "fine adjustment" phase.

Figure 6:
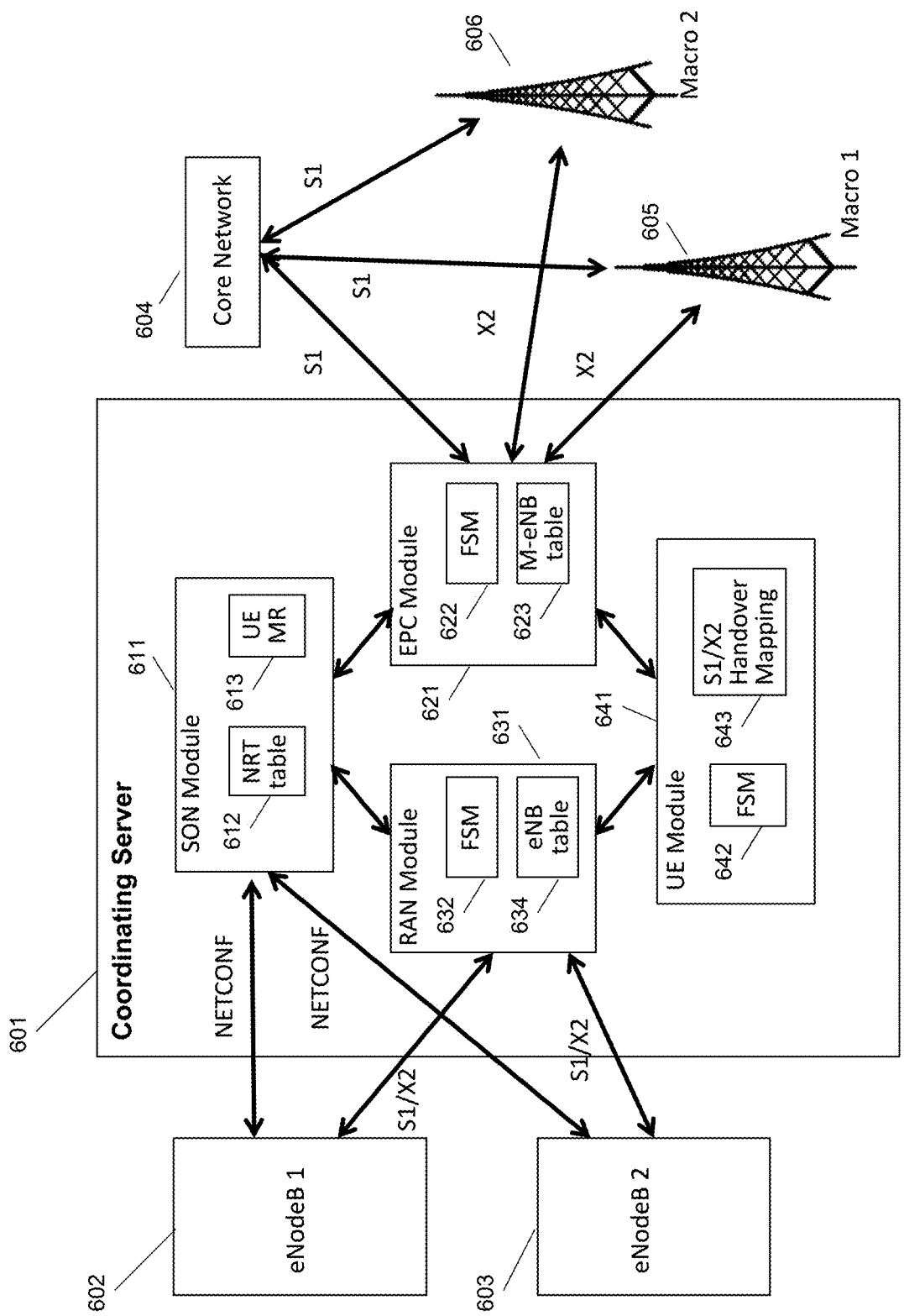
FIG. 6 is a schematic block diagram of a SON coordinating server, in accordance with some embodiments.

FIG. 6 is a schematic diagram of a SON coordinating server, in accordance with some embodiments. Coordinating server 601 provides services to, and is coupled to, nodeB 1 602 and nodeB 6 603, on a RAN side of a network (i.e., inside of the gateway), such as two-way proxying and NAT that hides the RAN from the core network. Server 601 provides services to, and is coupled to, 3G/4G core network 604, macro nodeB 605, and macro nodeB 606, on a core network side of the network (outside of the gateway). As described, the coordinating server may provide services to 3G RAN/core nodes, or 4G RAN/core nodes, or both. The coordinating server may perform interworking between 3G and 4G.

Within server 601 are self-organizing network (SON) module 611, containing neighbor relation table (NRT) 612 and UE measurement report processing module 613; evolved packet core (EPC) module 621, containing core network finite state machine module 622 and macro eNodeB table 623; radio access network (RAN) module 631, containing finite state machine module 632 and nodeB table 634; and user equipment (UE) module 641, containing UE finite state machine module 642 and S1/X2 handover mapping table 643. In some embodiments, SON module 611 may perform NRT maintenance, load information processing and fractional frequency reuse (FFR) processing; RAN module 631 may perform X2 association management with eNodeBs 602, 603; EPC module 621 may perform X2 association management with macro eNodeBs 605, 606; and UE module may perform X2 handover and S1/X2 translation between nodeBs 602, 603 and macro nodeBs 605, 606. Finite state machine modules 622, 632, 642 may include one or more states for modeling the operational state of a connected EPC, UE, or RAN, respectively. More than one FSM may be present at each of modules 621, 631, 641, so that server 601 may be enabled to model the operational state of several network nodes at once. All the above managers/modules interact with each other to accomplish the assigned functionality. In some embodiments, SON module 611 may control power control functionality as described herein in coordination with one or more cells.

In some embodiments, server 601 may include one or more processors, each with one or more processor cores. Each of modules 611, 621, 631, and 641 are coupled to each other within server 601, and may execute on one or more shared processors (not shown) coupled with memory (not shown). Server 601 may include a real-time operating system, such as a Linux operating system, and may include an operating system that distributes tasks among multiple cores. Server 601 may provide one or more of modules 611, 621, 631, 641 as processes, threads, user-mode or kernel-mode processes, processes in hardware or in software, in some embodiments. In some embodiments, each of modules 611, 621, 631, 641 may execute on the same server 601; in other embodiments, these modules may execute on remote machines connected via a network. In some embodiments, a remote failover server (not shown) may be made available for handling failures at server 601. The failover mechanism may involve checkpointing operations at server 601 in each of the modules therein. Certain operations may be hardware accelerated, such as network processing tasks, IPsec tasks, deep packet inspection tasks, or other tasks.

Server 601 may include one or more network interfaces; these network interfaces may include Ethernet (10/100/1000/10000 Mbit) interfaces, Wi-Fi (802.11a/b/g/n/ac/af/ad) interfaces, 3G or 4G interfaces, virtual interfaces, or other interfaces. In some embodiments, one network interface may be directed towards the core network and located at, or coupled to, EPC module 621; this interface would communicate using the S1 protocol to MME 604 and using the X2 protocol to macro cells 605, 606. In some embodiments, another network interface may be directed towards one or more RANs internal to the gateway and connected to RAN module 631, for communicating to RANs 602, using either S1 or X2 as appropriate. Translation or interworking of protocols may occur at one or more of modules 611, 621, 631, or 641 as appropriate. In some embodiments, SON module 611 may also be coupled to an interface for communicating with RANs 602, 603; this interface may be labeled the SON interface, and the NETCONF protocol (XML over HTTPS) may be used to communicate in a proprietary or non-proprietary manner with RANs 602, 603 regarding network configuration, orchestration, and coordination operations.

Figure 7:
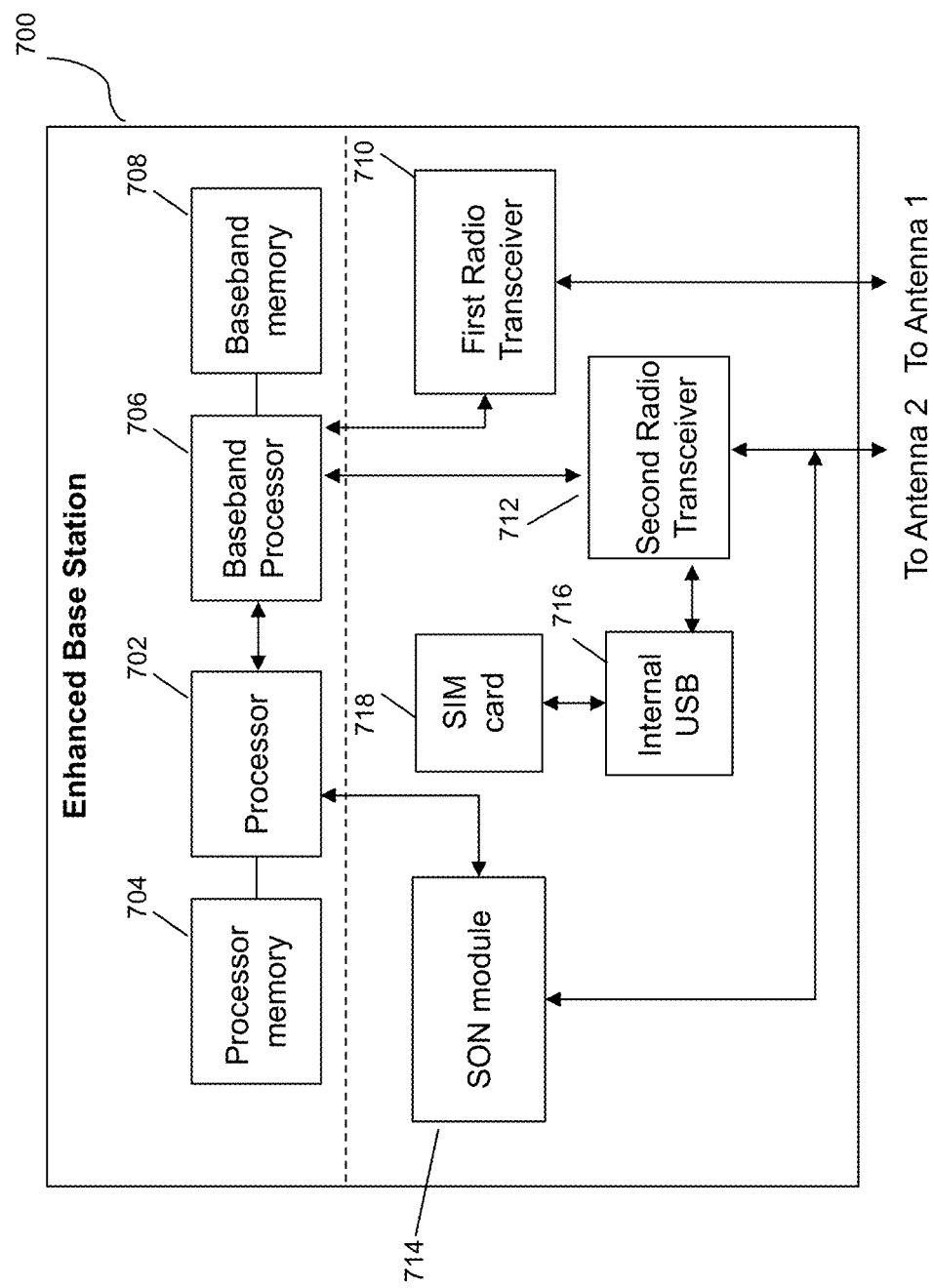
FIG. 7 is a schematic block diagram of an enhanced base station, in accordance with some embodiments.

FIG. 7 is a schematic diagram of an enhanced base station, in accordance with some embodiments. Base station 700 may include processor 702, processor memory 704 in communication with the processor, baseband processor 706, and baseband processor memory 708 in communication with the baseband processor. Base station 700 may also include first radio transceiver 710 and second radio transceiver 712, internal universal serial bus (USB) port 716, and subscriber information module card (SIM card) 718 coupled to USB port 714. In some embodiments, the second radio transceiver 712 itself may be coupled to USB port 716, and communications from the baseband processor may be passed through USB port 716. The enhanced base station may be a mesh network base station, in communication with other mesh nodes via Wi-Fi. SON module 714 may also be provided, providing the power control functionality as described herein, by itself or in conjunction with a SON server/SON gateway.

Processor 702 and baseband processor 706 are in communication with one another. Processor 702 may perform routing functions, and may determine if/when a switch in network configuration is needed. Baseband processor 706 may generate and receive radio signals for both radio transceivers 710 and 712, based on instructions from processor 702. In some embodiments, processors 702 and 706 may be on the same physical logic board. In other embodiments, they may be on separate logic boards.

The first radio transceiver 710 may be a radio transceiver capable of providing LTE eNodeB functionality, or 5G gNodeB functionality, and may be capable of higher power and multi-channel OFDMA. The second radio transceiver 712 may be a radio transceiver capable of providing LTE UE functionality. Both transceivers 710 and 712 are capable of receiving and transmitting on one or more LTE bands. In some embodiments, either or both of transceivers 710 and 712 may be capable of providing both LTE eNodeB and LTE UE functionality. Transceiver 710 may be coupled to processor 702 via a Peripheral Component Interconnect-Express (PCI-E) bus, and/or via a daughtercard. As transceiver 712 is for providing LTE UE functionality, in effect emulating a user equipment, it may be connected via the same or different PCI-E bus, or by a USB bus, and may also be coupled to SIM card 718.

SIM card 718 may provide information required for authenticating the simulated UE to the evolved packet core (EPC). When no access to an operator EPC is available, local EPC 720 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 700 is not an ordinary UE but instead is a special UE for providing backhaul to device 700.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 710 and 712, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 702 for reconfiguration.

Other elements and/or modules may also be included, such as a nodeB, home eNodeB, a local gateway (LGW), a self-organizing network (SON) module, or another module. Additional radio amplifiers, radio transceivers and/or wired network connections may also be included.

Processor 702 may identify the appropriate network configuration, and may perform routing of packets from one network interface to another accordingly. Processor 702 may use memory 704, in particular to store a routing table to be used for routing packets. Baseband processor 706 may perform operations to generate the radio frequency signals for transmission or retransmission by both transceivers 710 and 712. Baseband processor 706 may also perform operations to decode signals received by transceivers 710 and 712. Baseband processor 706 may use memory 708 to perform these tasks.

Additional embodiments of the present application are contemplated.

In the present disclosure, the words "cell," "eNB," "eNodeB," and "gNodeB" are used to refer to a cellular base station. However, one of skill in the art would appreciate that it would be possible to provide the same functionality and services to other types of base stations, specifically to home eNodeBs (HeNodeBs), as well as any equivalents.

The same or equivalent method has been contemplated by the inventors for other wireless radio access technologies (RATs). For example, the equivalent of CPICH in LTE is the Reference Signal (RS), and the equivalent to the RSCP is RSRP or RSRQ. So we could analogize RSCP to RSRQ and perform the equivalent sequence of steps described herein to obtain a fine-grained adjustment to transmission power and hence cell coverage area in LTE. The same steps could be used in 5G as well.

While the present disclosure uses the terms "small cell" and "macro cell," this term is used merely to illustrate the concepts herein, and nothing is implied regarding size, power level etc. for any cells that could be used with the disclosed systems and methods, i.e. "small cell" may be interpreted as including macro cells, femto cells, multi-radio access technology (RAT) access nodes, indoor cells, outdoor cells, etc. The word "X2" herein may be understood to include X2 or also Xn, as appropriate.

Various alternative embodiments are also contemplated by the inventors. For example, certain functions may be performed at an eNodeB, or at a multi-radio access technology node (multi-RAT) node, instead of at a virtualization server. The virtualization server may be known as an LTE access controller. The functions of the virtualization server may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

The protocols described herein may be optimized for greater or lesser latency, for more or fewer mesh nodes, for more or fewer data streams, and other alternatives. In some embodiments, these optimizations may be performed at the eNodeB, at the virtualization server, within a function performing radio resource allocation and coding selection, or at another location. In some embodiments, a virtualization server may identify and initiate power adjustments to improve channel quality.

In some embodiments, the mesh network nodes may provide complete or partial guesses at what paths are the optimal or best paths during a particular time interval, and may be enabled to send messages back to the virtualization server to communicate these complete or partial guesses.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method for determining an appropriate transmit power of a cell based on a desired coverage distance, comprising:
    initializing, at a cell in a radio access network, a cell reference signal transmit power level;
    broadcasting a cell signal power measure level for user devices attempting to connect to the cell;
    progressively lowering the cell signal power measure at the cell;
    broadcasting the lowered cell signal power measure;
    deriving a plurality of user equipment (UE) attach request distances;
    comparing the plurality of UE attach request distances against a maximum distance to obtain a number of UE attach requests received from UEs physically located beyond the maximum distance; and
    setting the cell reference signal transmit power based on the number of UE attach requests received from beyond the maximum distance,
    thereby iteratively determining an appropriate cell reference signal transmit power based on the maximum distance and on UE attach requests received at the cell.

2. The method of claim 1, further comprising setting the cell reference signal transmit power when a statistically significant number of UE attach requests is received from distances less than the maximum distance but not from distances greater than the maximum distance.

3. The method of claim 1, further comprising further lowering the cell signal power measure at the cell when a statistically significant number of UE attach requests is received from distances equal to or greater than the maximum distance, and collecting a further plurality of UE attach request propagation delay statistics.

4. The method of claim 1, further comprising analyzing the plurality of propagation delay statistics to obtain a statistically significant number of propagation delay statistics.

5. The method of claim 1, further comprising deriving the maximum distance from a maximum propagation delay of a UE request message based on a known timing of the UE request message relative to a reference signal broadcast by the cell.

6. The method of claim 1, wherein the cell is a Universal Mobile Telecommunications Service (UMTS) nodeB, the cell reference signal transmit power is a Common Pilot Channel (CPICH) transmit power, and the cell signal power measure is Qrxlevmin.

7. The method of claim 1, wherein the signal power measure is received signal reference power (RSRP) or received signal reference quality (RSRQ).

8. The method of claim 1, further comprising performing fine adjustment by stepping the value of the cell reference signal transmit power through a range of values.

9. A non-transitory computer-readable medium comprising instructions which, when executed on a self-organizing network coordinating gateway, cause the gateway to perform:
    send a configuration message to initialize, at a cell in a radio access network, a cell reference signal transmit power level;
    cause the cell to broadcast a cell signal power measure for user devices attempting to connect to the cell;
    deriving a plurality of UE attach request distances;
    comparing the plurality of UE attach request distances against a maximum distance to obtain a number of UE attach requests received from UEs physically located beyond the maximum distance; and
    cause the cell to set the cell reference signal transmit power based on the number of UE attach requests received from beyond the maximum distance,
    thereby iteratively determining an appropriate cell reference signal transmit power based on the maximum distance and on UE attach requests received at the cell.

10. The non-transitory computer-readable medium of claim 9, the instructions further comprising causing the cell to set the cell reference signal transmit power when a statistically significant number of UE attach requests is received from distances less than the maximum distance but not from distances greater than the maximum distance.

11. The non-transitory computer-readable medium of claim 9, the instructions further comprising further lowering the cell signal power measure at the cell when a statistically significant number of UE attach requests is received from distances equal to or greater than the maximum distance, and collecting a further plurality of UE attach request propagation delay statistics.

12. The non-transitory computer-readable medium of claim 9, the instructions further comprising analyzing the plurality of propagation delay statistics to obtain a statistically significant number of propagation delay statistics.

13. The non-transitory computer-readable medium of claim 9, the instructions further comprising deriving the maximum distance from a maximum propagation delay of a UE request message based on a known timing of the UE request message relative to a reference signal broadcast by the cell.

14. The non-transitory computer-readable medium of claim 9, wherein the cell is a Universal Mobile Telecommunications Service (UMTS) nodeB, the cell reference signal transmit power is a Common Pilot Channel (CPICH) transmit power, the cell signal power measure is Qrxlevmin, and the self-organizing network coordinating gateway is located in a UMTS core network or between the UMTS core network and the cell.

15. The non-transitory computer-readable medium of claim 9, wherein the cell signal power measure is received signal reference power (RSRP) or received signal reference quality (RSRQ), and the self-organizing network coordinating gateway is located between an LTE core network and the cell.

16. The non-transitory computer-readable medium of claim 9, the instructions further comprising performing fine adjustment by stepping the value of the cell reference signal transmit power through a range of values.

17. A method for determining an appropriate transmit power of a cell based on a desired coverage distance, comprising:

initializing, at a cell in a 5G radio access network, a cell reference signal transmit power level;

broadcasting a cell signal power measure level for user devices attempting to connect to the cell;

progressively lowering the cell signal power measure at the cell;

broadcasting the lowered cell signal power measure;

deriving a plurality of user equipment (UE) attach request distances;

comparing the plurality of UE attach request distances against a maximum distance to obtain a number of UE attach requests received from UEs physically located beyond the maximum distance; and setting the cell reference signal transmit power based on the number of UE attach requests received from beyond the maximum distance, thereby iteratively determining an appropriate cell reference signal transmit power based on the maximum distance and on UE attach requests received at the cell.

18. The method of claim 17, further comprising setting the cell reference signal transmit power when a statistically significant number of UE attach requests is received from distances less than the maximum distance but not from distances greater than the maximum distance.

19. The method of claim 17, further comprising further lowering the cell signal power measure at the cell when a statistically significant number of UE attach requests is received from distances equal to or greater than the maximum distance, and collecting a further plurality of UE attach request propagation delay statistics.

20. The method of claim 17, further comprising analyzing the plurality of propagation delay statistics to obtain a statistically significant number of propagation delay statistics.

\* \* \* \* \*